Feb. 16, 1954     K. FRISCHMANN     2,669,158
ADJUSTMENT MECHANISM FOR MICROSCOPES
Filed Aug. 31, 1950
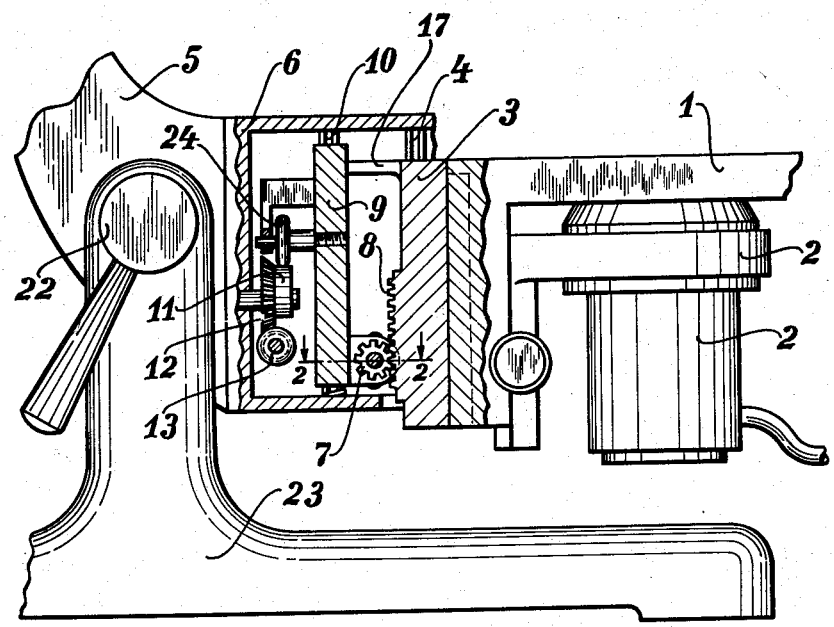
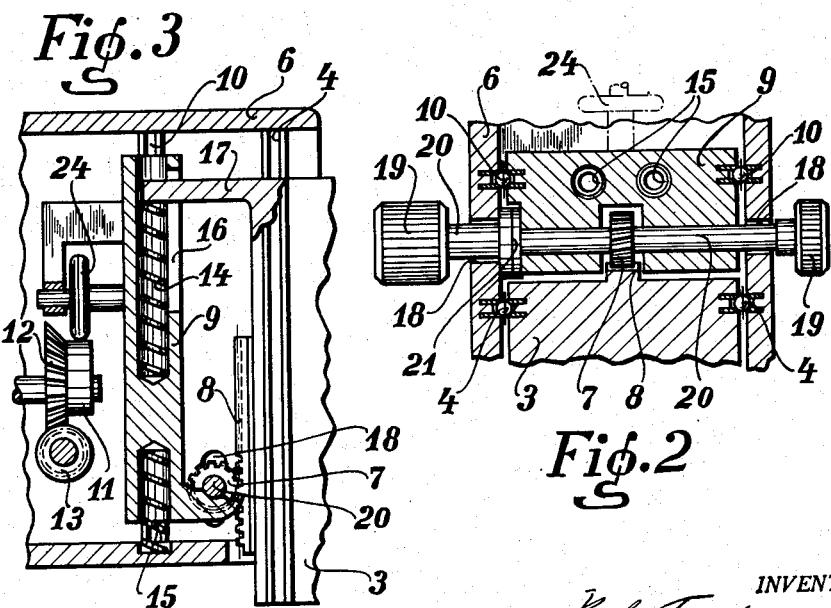
INVENTOR.
Karl Frischmann
BY Fred A. Klein
his attorney.

Patented Feb. 16, 1954

2,669,158

UNITED STATES PATENT OFFICE 2,669,158

ADJUSTMENT MECHANISM FOR MICROSCOPES

Karl Frischmann, Wetzlar-Garbenheim, Germany, assignor to Ernst Leitz G. m. b. H., Wetzlar, Germany, a corporation of Germany.

Application August 31, 1950, Serial No. 182,493

1 Claim. (Cl. 88—39)

The present invention relates to an adjustment mechanism for microscopes, and more particularly to an improved coarse and fine focusing adjustment mechanism. Preferably, this invention is used in connection with microscopes which are focused by moving the stage or platform thereof.

In known microscopes of the above described nature, the stage is mounted on the stand by means of two slides, the slide designed for fine adjustment being next to the stage and supported on a second slide designed for coarse adjustment, the second slide being slidably attached to guide means within the microscope stand. This arrangement has the major disadvantage, that the load and the forces created by the movement of the object stage affect the fine adjustment slide first and are transferred therefrom to the coarse adjustment slide. Consequently, the fine adjustment slide is subjected to the heaviest load and this leads to unsatisfactory operational conditions.

It is a principal object of the present invention to provide an arrangement of the coarse and fine adjustment mechanism for microscopes wherein the loads and transverse displacement forces created during operation of the microscope are effectively diverted from the fine adjustment means proper.

It is also an object of this invention to provide a compact and unitary coarse and fine adjustment mechanism for microscopes.

It is a further object of the invention to provide an adjustment mechanism for microscopes wherein the fine adjustment means is encased within a protective housing.

The above and other objects and advantages are accomplished in accordance with the present invention by providing the coarse adjustment slide next to the microscope stage with its guide in the stand and being adapted to sustain the forces exerted in a direction transverse to the direction of movement, and a separately disposed second slide for fine adjustment, said second slide being supported in another guide which is also disposed in the stand and is not subjected to any substantial transverse forces. Preferably, the fine adjustment slide is located in the interior of a housing for the coarse adjustment slide whereby the entire arrangement is compact and the fine adjustment means is protected by the housing.

In a preferred embodiment of the invention, the adjustment mechanism comprises a coarse adjustment slide moving in slide guides in the interior of the microscope stand, said slide being adapted to support the stage and being provided with a rack, and a fine adjustment slide with separate slide guides, said slides being operatively connected by means of driving means, such as a pinion, for the coarse adjustment slide, said driving means being supported by the fine adjustment slide. The coarse adjustment slide may be provided with an arm resting against a load equalizing spring in the fine adjustment slide while the latter slide is supported by a roller which rests upon an eccentric wheel forming part of the fine adjustment driving mechanism. The driving means for the coarse adjustment is preferably provided with a brake adapted to counteract the weight of the coarse adjustment slide and the stage supported thereby.

By means of the above described adjustment mechanism, the load of the adjustment parts themselves and practically all transverse forces created by the operation of the microscope are diverted from the fine adjustment means proper. These transverse loads are mostly absorbed by the guide means of the coarse adjustment slide, and transferred to the microscope stand whereby faultless fine adjustment of the stage is assured due to the release of pressures on the fine adjustment slide. The guide means for the slides may desirably comprise steel rails and balls to improve the friction conditions, in a manner known per se.

While the invention has been described in connection with the adjustment of a microscope stage, it is also adapted for the adjustment of a microscope tubus, particularly of a binocular tubus. Further details of the invention and additional objects and advantages will become more apparent from the following description taken in conjunction with the accompanying drawing which is illustrative but in no way limiting of the invention, and in which:

Fig. 1 shows an elevation, partly in section, of a microscope stage and stand incorporating the adjustment mechanism of the invention;

Fig. 2 is a sectional view of the two adjustment slides, taken along line II—II of Fig. 1; and Fig. 3 is an enlarged sectional view of the fine adjustment slide and its operative connection with the coarse adjustment slide.

Referring now to the drawing, Fig. 1 shows a conventional microscope stage 1 having adjustably attached thereto an illuminating apparatus 2 comprising, for instance, a condenser and a lamp. The stage and illuminating apparatus are supported by a slide 3 which serves for the coarse adjustment of the stage and is slidably mounted on ball bearings in guide rails 4 of housing 6 which is fixedly connected to limb 5 of the microscope. Slide 3 is displacable by means of pinion 7 and rack 8. In the interior of the housing 6 there is a second slide 9 adapted for fine adjustment and slidably mounted on ball bearings in guide rails 10. Fine adjustment slide 9 also serves as support for pinion 7. Roller 24 is attached to slide 9 and rests on eccentric wheel 11 of the fine adjustment gear 12, 13. Buffer spring 14 and release spring 15 are arranged in the interior of fine adjustment slide 9 which also has a slot 16 adapted to cooperate with arm 17 of coarse adjustment slide 3 whereby arm 17 rests upon spring 14. Opposite walls of housing 6 are provided with two registering slots 18 through which the axle 20 of pinion 7 protrudes. The axle carries knobs 19. Friction brake 21, carried by axle 20, serves as an automatic brake for slide 3. As illustrated in Fig. 2, the friction brake consists, in a manner well known per se, of two friction discs arranged to participate in the rotary movement of axle 20 and being resiliently pressed apart in the direction of the axis of the axle to engage the adjacent wall of housing 6 and the adjacent wall of slide 9, respectively. The frictional engagement of the discs with the adjacent walls tends to oppose the rotation of the axle as well as the sliding movement of slide 9. Slots 18 also serve to set the extreme limits of movement of fine adjustment slide 9. Microscope limb 5 with the body carried thereby is pivotally supported on base 23 by means of hinge joint 22, in the usual manner.

The adjustment mechanism of the invention operates as follows:

Actuation of knobs 19 effects the coarse adjustment of the microscope by moving slide 3 in slide guide rails 4 which carry the slide and, therefore, absorb all forces transverse to the direction of displacement. The weight of the coarse adjustment slide and the other microscope parts carried thereby which is effective in the direction of the sliding movement is transferred by means of pinion 7, arm 17 and spring 14 to fine adjustment slide 9 whereby slide 9 carries only a load in the direction of its own slide guide rails 10. This load is partly balanced by release spring 15 and the rest of the load is transferred by means of roller 24 to eccentric wheel 11 of the fine adjustment gear 12, 13. To effect fine adjustment of the microscope, wheel 11 is turned and, in accordance with its eccentricity, the slide 9 is moved up or down along its guide rails 10. Axle 20 of pinion 7, which is supported within slide 9, participates in the movement thereof and, since the automatic brake 21 prevents the actuation of pinion 7 and rack 8, coarse adjustment slide 3 is displaced in the same direction as fine adjustment slide 9. Continuous contact between roller 24 and wheel 11 is maintained by the residual load of the moving parts of the objective which is effective in the direction of guide rails 4, 10 and is only imperfectly balanced by the springs. Brake 21 serves also to prevent touching of the stage and tubus since it works like a friction coupling for the two parts moving against each other.

While the invention has been described and illustrated with reference to some preferred embodiments, it is to be clearly understood that various modifications thereof are within the skill of the art without departing from the spirit and scope of the invention as defined in the appended claim.

What is claimed is:

In a microscope having a stand comprising a chamber with side walls, and a movable stage for holding a specimen: a device for adjustably moving the stage to bring the specimen into focus of the optional system of the microscope, said device comprising a coarse adjustment slide carrying the stage, a fine adjustment slide, means for moving said coarse adjustment slide in the direction of the optical axis of the microscope, said coarse adjustment slide moving means being carried by the fine adjustment slide, means disposed in the stand of the microscope for moving the fine adjustment slide in the direction of the optical axis of the microscope, first guide means for the coarse adjustment slide, and second guide means for the fine adjustment slide, the two guide means being arranged directly and separately from each other on said side walls and being parallel to each other to assure parallel motion of the slides.

KARL FRISCHMANN.

References Cited in the file of this patent

UNITED STATES PATENTS

| Number | Name | Date |
|---|---|---|
| 1,429,557 | Bauer | Sept. 19, 1922 |
| 2,480,001 | Czarnikow | Aug. 23, 1949 |
| 2,530,352 | Gallasch | Nov. 14, 1950 |

FOREIGN PATENTS

| Number | Country | Date |
|---|---|---|
| 640,723 | Great Britain | July 26, 1950 |